A

United States Patent
Friedrich et al.

(10) Patent No.: US 9,722,852 B2
(45) Date of Patent: Aug. 1, 2017

(54) ON-DEMAND ENCAPSULATING OF TIMED METADATA IN A NETWORK ENVIRONMENT

(71) Applicant: CISCO TECHNOLOGY, INC., San Jose, CA (US)

(72) Inventors: Eric Colin Friedrich, Somerville, MA (US); Matthew Francis Caulfield, Clinton, MA (US); Carol Etta Iturralde, Framingham, MA (US); Mahesh Vittal Viveganandhan, Cupertino, CA (US); Scott C. Labrozzi, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 245 days.

(21) Appl. No.: 13/902,576

(22) Filed: May 24, 2013

(65) Prior Publication Data
US 2014/0351318 A1 Nov. 27, 2014

(51) Int. Cl.
*G06F 15/16* (2006.01)
*H04L 29/08* (2006.01)
(Continued)

(52) U.S. Cl.
CPC ... *H04L 29/08117* (2013.01); *H04N 21/2362* (2013.01); *H04N 21/23439* (2013.01);
(Continued)

(58) Field of Classification Search
CPC ........ H04L 29/08117; H04N 21/85406; H04N 21/858; H04N 21/8547; G06F 17/30569; G06F 21/6218
(Continued)

(56) References Cited

U.S. PATENT DOCUMENTS 7,599,947 B1* 10/2009 Tolbert et al.
7,716,662 B2* 5/2010 Seiden .......................... 717/173
(Continued)

FOREIGN PATENT DOCUMENTS

CN 103081506 5/2013
WO WO2009/024926 2/2009
(Continued)

OTHER PUBLICATIONS

PCT Jul. 29, 2014 International Search Report and Written Opinion of the International Searching Authority from International Application Serial No. PCT/US2014/037732.
(Continued)

*Primary Examiner* — Thu Ha Nguyen
(74) *Attorney, Agent, or Firm* — Patent Capital Group (57) ABSTRACT

A method is provided in one example and includes receiving media content including timed metadata, generating a common format asset including the timed metadata and a timed metadata index including at least one reference point corresponding to the common format asset. Each reference point includes state context information of the timed metadata at a particular instance of time. The method may further include receiving a request for the timed metadata from a particular client device, and retrieving a determined amount of the timed metadata from the common format asset using the timed metadata index. In a particular example, the determined amount of the timed metadata is an amount sufficient to display a current timed metadata context corresponding to the request.

20 Claims, 5 Drawing Sheets

(51) Int. Cl.
| | |
|---|---|
| *H04N 21/8547* | (2011.01) |
| *H04N 21/2343* | (2011.01) |
| *H04N 21/2362* | (2011.01) |
| *H04N 21/845* | (2011.01) |
| *H04N 21/854* | (2011.01) |
| *H04N 21/84* | (2011.01) |

(52) U.S. Cl.
CPC ......... *H04N 21/84* (2013.01); *H04N 21/8456* (2013.01); *H04N 21/8547* (2013.01); *H04N 21/85406* (2013.01)

(58) Field of Classification Search
USPC .............................. 709/203, 226, 205, 219
See application file for complete search history.

(56) References Cited

U.S. PATENT DOCUMENTS

| | | | |
|---|---|---|---|
| 7,913,277 B1 | 3/2011 | Rahrer | |
| 9,158,775 B1* | 10/2015 | Tomkins | G06F 17/30041 |
| 9,253,548 B2* | 2/2016 | Swaminathan | H04N 21/64738 |
| 2003/0004937 A1* | 1/2003 | Salmenkaita | G01C 21/20 |
| 2006/0265385 A1* | 11/2006 | Agrawal | G06F 17/30566 |
| 2007/0150478 A1* | 6/2007 | Cho | H04L 29/12113 |
| 2007/0150595 A1* | 6/2007 | Bhorania | H04L 67/325 709/226 |
| 2007/0255496 A1* | 11/2007 | Fong et al. | 701/213 |
| 2008/0222074 A1* | 9/2008 | Lieberwirth et al. | 706/50 |
| 2011/0093471 A1* | 4/2011 | Brockway | G06F 17/30616 707/747 |
| 2011/0113011 A1* | 5/2011 | Prorock | G11B 27/36 707/634 |
| 2011/0125904 A1* | 5/2011 | Branigan | G06F 17/30911 709/226 |
| 2012/0191716 A1* | 7/2012 | Omoigui | H01L 27/1463 707/740 |
| 2012/0254917 A1* | 10/2012 | Burkitt | G06F 17/30817 725/40 |
| 2014/0351318 A1* | 11/2014 | Friedrich et al. | 709/203 |
| 2014/0365678 A1* | 12/2014 | Herrfurt | H04H 20/106 709/231 |
| 2015/0067102 A1* | 3/2015 | Tsarkova | H04N 21/21805 709/217 |
| 2015/0074129 A1* | 3/2015 | Friedrich et al. | 707/756 |
| 2016/0182671 A1* | 6/2016 | Dakhane | H04L 65/605 709/219 |
| 2016/0352827 A1* | 12/2016 | Procopio | H04L 67/1095 |

FOREIGN PATENT DOCUMENTS

| | | |
|---|---|---|
| WO | WO2013/033565 | 3/2013 |
| WO | WO2014/189703 | 11/2014 |

OTHER PUBLICATIONS

Wikipedia, the free encyclopedia, "CEA-708," Wikipedia®, Nov. 15, 2012, 15 pages; http://en.wikipedia.org/wiki/CEA-708.

Wikipedia, the free encyclopedia, Dynamic Adaptive Streaming over HTTP, Wikipedia®, Nov. 2, 2012, 3 pages; http://en.wikipedia.org/wiki/Dynamic_Adaptive_Streaming_over_HTTP.

RidgeRun Developer Connection, GStreamer and in-band metadata, Nov. 15, 2012, 5 pages; https://developer.ridgerun.com/wiki/index.php/GStreamer_and_in-band_metadata.

Dr. Gorry Fairhurst, "MPEG-2 Transmission," ©2001, 9 pages; http://www.erg.abdn.ac.uk/future-net/digital-video/mpeg2-trans.html.

Wikipedia, the free encyclopedia, "MPEG transport stream," Wikipedia®, Feb. 26, 2013, 7 pages; http://en.wikipedia.org/wiki/MPEG_transport_stream.

Wong, et al., "SMTE-TT Embedded in ID3 for HTTP Live Streaming," IETF Informational Internet Draft, Jun. 2012, 7 pages; http://tools.ietf.org/pdf/draft-smpte-id3-http-live-streaming-00.pdf.

PCT Nov. 24, 2015 International Preliminary Report on Patentability from International Application Serial No. PCT/US2014/037732.

* cited by examiner

ON-DEMAND ENCAPSULATING OF TIMED METADATA IN A NETWORK ENVIRONMENT

TECHNICAL FIELD

This disclosure relates in general to the field of communications and, more particularly, to providing on-demand encapsulating of timed metadata in a network environment.

BACKGROUND

An MPEG-2 Transport Stream (MPEG2-TS) as developed by the Moving Picture Expert Group (MPEG) typically contains video, audio, and metadata tracks that are transmitted together in a multiplexed format. When the MPEG2-TS formatted data is converted from the MPEG2-TS format to an adaptive bitrate (ABR) streaming format, the metadata tracks are converted into a format supported by an ABR client. Adaptive bitrate streaming is a technique in which the quality of a media stream is adjusted when the media stream is delivered to a client in order to conform to a desired bitrate. The conversion of metadata tracks should occur for all types of timed metadata including, but not limited, to closed captions, subtitles, application specific metadata, and ad-insertion markers. Existing ABR pipelines convert the source asset into target specific formats and store the result on an origin server until requested by the client. This procedure produces multiple versions of audio, video and metadata tracks for each of the different formats required by each ABR client. This approach negatively impacts storage as each version of the audio, video and metadata tracks should be stored within one or more storage devices as well as negatively impacting bandwidth usage within the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving common format media including timed metadata. The common format media can include any suitable information or data. The method further includes generating a common format asset including the timed metadata and a timed metadata index including at least one reference point corresponding to the common format media. Each reference point can include state context information of the timed metadata at a particular instance of time.

In more particular embodiments, the method further includes sending the common format asset to at least one server. In still more particular embodiments, the method further includes receiving a request for the timed metadata from a particular client device, and retrieving a determined amount of the timed metadata from the common format asset using the timed metadata index. In other particular embodiments, the determined amount of the timed metadata is an amount sufficient to display a current timed metadata context corresponding to the request. In more particular embodiments, the method further includes converting the retrieved timed metadata to a target format suitable for the particular client device, and sending a response message including the retrieved timed metadata in the target format to the particular client device. In a particular embodiment, the common format media is an MPEG2-TS adaptive transport stream file. In another particular embodiment, the common format media an ISO Base Media File Format (ISO-BMFF) file. In other particular embodiments, the timed metadata includes at least one of caption data, subtitle data, ad-insertion marker data and application-specific metadata.

Example Embodiments

Figure 1:
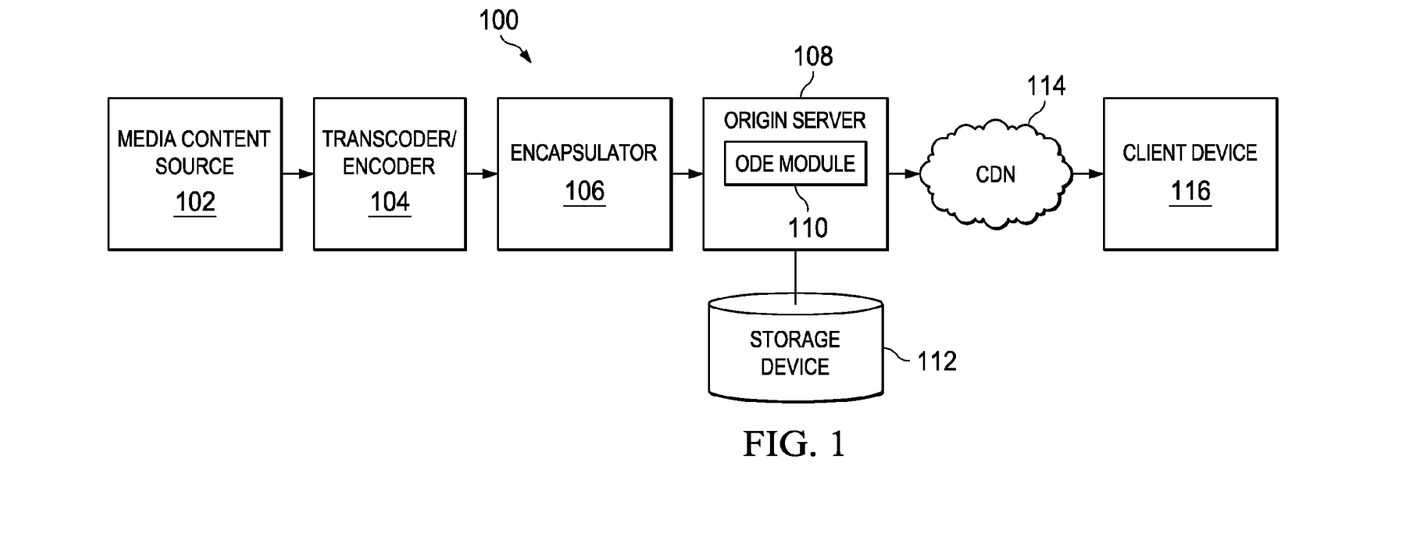
FIG. 1 is a simplified block diagram of a communication system for providing on-demand encapsulating of timed metadata in a network environment in accordance with one embodiment of the present disclosure.

Referring now to FIG. 1, FIG. 1 is a simplified block diagram of a communication system 100 for providing on-demand encapsulating of timed metadata in a network environment in accordance with one embodiment of the present disclosure. FIG. 1 includes a media content source 102, a transcoder/encoder 104, an encapsulator 106, an origin server 108 having an On-Demand Encapsulation (ODE) module 110, a storage device 112, a content distribution network (CDN) 114, and a client device 116. In the particular illustrated embodiment, media content source 102 is in communication with transcoder/encoder 104, and transcoder/encoder 104 is in further communication with encapsulator 106. Encapsulator 106 is in further communication with origin server 108, and origin server 108 is in further communication with storage device 112. Storage device 112 may include one or more of local storage, network storage, or any other suitable storage device. Origin server 108 is further in communication with client device 116 via CDN 114. Client device 116 may include one or more of a set-top box, a television, a computer, a mobile computing device, or any other suitable client device.

A fundamental issue in content delivery is the need to serve a wide variety of types of end-client devices. In the context of adaptive bit rate (ABR) video, these various end-client types each typically require specific metadata and video and audio formats. Examples of prevalent ABR client types include Microsoft HTTP Smooth Streaming (HSS), Apple HTTP Live Streaming (HLS), Adobe HTTP Dynamic Streaming (HDS), and MPEG Dynamic Adaptive Streaming over HTTP (DASH). A server which handles requests from a heterogeneous pool of ABR clients should typically store its media content including video, audio, and metadata in a form which can be easily translated to a target format that is suitable and recognizable by a particular client device. In a simple implementation, such a server could store a separate copy of a piece of media content for each end client device type. However, this approach negatively impacts storage and bandwidth usage. In a content distribution network (CDN), multiple formats of the same piece of content will be treated independently, further exacerbating the problem. A CDN is a network of intermediate nodes that function to cache content in a hierarchy of locations to decrease the load on the origin server 108 and to improve the quality of experience for the users using client device 116 to receive media content.

On-demand encapsulation (ODE) addresses the storage and bandwidth issues presented by the simple implementation. With ODE, a single representation of each piece of common format media is stored and cached by the server. Upon receiving a client request for the media content, the server re-encapsulates the common format media representation into an end-client-specific format. ODE provides a tradeoff between storage and computation requirements. While storing a common format media representation incurs lower storage overhead, re-encapsulating that representation on-demand is more usually expensive computationally than storing each end-client representation individually.

A common format asset should be chosen to meet the needs of all end-client ABR format types. The common format asset can include any suitable collection of items including the original common format media. The common format asset may also contain any suitable index files, both media indexes (i.e. audio/video), metadata index files, and a Media Presentation Description (MPD). The MPD is a manifest or file containing information about the media content such as one or more formats of segments of audio or video data. The common format asset and its associated metadata should be capable of being easily translated into an end-client format. An example of a common format asset that meets this requirement is Adaptive Transport Stream (ATS) with Dynamic Adaptive Streaming over HTTP (DASH) metadata. An Adaptive Transport Stream is an ABR conditioned annotated MPEG-2 Transport Stream (MPEG2-TS) stream with in-band metadata for signaling ABR fragment and segment boundaries. Dynamic Adaptive Streaming over HTTP (DASH) is a standard for describing ABR content. ISO Base Media File Format (ISO-BMFF) with DASH metadata (DASH/ISO-BMFF) is another example of a common format asset that may be used.

A typical ABR content workflow for on-demand encapsulation may be understood as a pipeline of functional blocks strung together for the purpose of delivering ABR content to end-clients. Raw/compressed media content arrives into the system and an encoding/transcoding stage converts the content into multiple ABR-conditioned compressed versions. This represents the common format media, which can include these elements, as well as any other information that may be propagating network, or that may be the byproduct of any suitable video processing. An encapsulation stage further processes the common format media to produce a common format asset, which contains the sourced common format media, various indexes of this media content and a media presentation description. A recording stage accepts the common format asset and writes it to storage. An origination stage reads the common format asset and performs re-encapsulation of the media into a target format when a request is received from a particular end client device. The origination stage serves media content in the target format based upon a request received from a client device. The target format of the media content may be based upon client type. In particular examples, a CDN may cache content in a hierarchy of locations to decrease the load on the origination stage and to improve the quality of experience for the users in the client stage. Finally, in a client stage, a client device receives the requested media content decodes and presents the content to the end-user.

A common format media stream such as an Adaptive Transport Stream typically contains multiplexed video, audio, and timed metadata. When the content is converted to an adaptive bitrate (ABR) streaming format, the metadata is converted into a target format supported by the particular ABR client such as client device 116. This conversion should occur for all types of timed metadata, which includes, but which is not limited to, captions, subtitles, application-specific metadata, ad-insertion markers, or any other suitable metadata. For example, a Microsoft Smooth™ client requires caption data formatted in SMPTE Timed Text Markup Language (TTML).

Existing non-on-demand ABR pipelines convert the source asset into target specific formats and store the result on an origin server until requested by the client. This typically includes multiple versions of audio, video and metadata tracks for the different ABR formats. However, with on-demand encapsulation technology, origin servers no longer need to store multiple versions of the same ABR asset. Instead, by storing the source asset data using a common format asset, such as using the common intermediate file (CIF) format, ODE module 110 can create a specific ABR segment needed, in the correct target format, in response to a client's request.

Applying on-demand encapsulation to timed metadata tracks results in two types of outputs. First, the client manifest produced by on-demand encapsulation indicates the timeline for the timed metadata. Second, the on-demand encapsualation produces timed metadata segments in response to client requests. Just as with audio and video, ODE module 110 may use timed metadata indexing data that describes the location of timed metadata in the media content contained within the common format asset.

However, there are at least two ODE challenges that arise with respect to processing timed metadata in an on-demand encapsulation context. The first challenge relates to state based metadata, such as timed metadata, and the second to the efficiency of creating timed metadata tracks in the target format. In certain examples described herein, various forms of closed captioning are described. Closed captions are used as an example because they are widely deployed and present a wide range of typical challenges encountered with timed metadata. However, the principles described herein are not specific to caption data and may be applied to other forms of metadata, in particular timed or state based metadata as well.

ABR segments sent to client device 116 should be fully self-contained and independent of all other segments. In order to correctly render an ABR segment, no previous or future segment should be needed by client device 116. Compressed media such as video contains frame to frame state in which one frame depends on prior (and potentially future) frames, the exception being a closed GOP boundary via an instantaneous decoder refresh (IDR) frame. To be self-contained in the video domain each segment may start with an IDR frame. In on-demand encapsulation processing, for example, a particular video segment N can be generated independent of the processing of video segments prior to N. Given the self-containment nature of the video frames, on-demand encapsulation video segment creation can be non-linear, i.e. not in presentation time order.

However, some forms of metadata, such as caption data, contain a state information that does not necessarily have points within the timed metadata at which state is reset, so called timed metadata reference points. Caption data authored as paint-on and roll-up styles are continuous in nature and there is no IDR equivalent to delineate a segment. For TTML HSS captions for example, if one processes data represented by the time domain of a segment, the discrete generation of only segment N would not be equivalent to the same segment N generated sequentially after segment N−1. As this form of metadata is not self-contained, the generation of such stateful metadata cannot be purely non-linear. If these metadata segments are cached, this non-equivalence could cause severe rendering issues. To avoid this, on-demand encapsulation needs to process some amount of continuous timed metadata prior to the particular segment N to ensure the equivalent reconstruction of state and the proper generation of segment N independent of the order in which it was requested.

Some authored styles of continuous metadata may have boundary points. The pop-on style of closed captions is such an example. However, authored styles may dynamically change in content, for example, transition from pop-on to paint-on and back. Instead of being implicitly derived from other media tracks, this may be taken advantage of in common format asset indexing. Timed metadata indexing may be extended to explicitly delineate metadata tracks, segmenting using known boundary points when available and flagging these while adopting other media tract segment delineations when boundaries are not known.

On-demand encapsulation efficiency is an issue for fetching small pieces of sparse timed metadata. Timed metadata tends to be of multiple magnitudes smaller than other media tracks such as video and audio and yet by default the metadata may be interleaved with these other tracks. Thus, within indexing of timed metadata the fetching of timed metadata may result in the fetching of other undesired media of much larger bandwidths than the timed metadata. Efficiency is also an issue when fetching data for the purposes of handling stateful continuous metadata. ODE module 110 should fetch only the minimum amount of data needed to reconstruct the correct state. Fetching more data than is needed results in state that is no more correct, but wasteful of bandwidth. Various embodiments described herein describe a procedure for indexing and creating timed metadata tracks by encapsulating, at play out time, only the timed metadata segments needed at that particular time.

Media content source 102 is in communication with transcoder/encoder 104 and is configured to provide media content to transcoder/encoder 104. In one or more embodiments, the source media may include video and/or audio and associated timed metadata. The timed metadata may include for example, closed caption data, subtitle data, ad-insertion marker data or any other application specific metadata. In at least one embodiment, the media content is provided to transcoder/encoder 104 in a raw format. In still other embodiments, the media content may first be encoded such that the raw format media content is converted into a compressed format before being provided to transcoder/encoder 104. In a particular embodiment, the media content is encoded in an MPEG2-TS format. In still other embodiments, the media content may be encoded in an H.264 format or any other suitable format.

Transcoder/encoder 104 is configured to transcode the source media into one or more transcoded versions of the media content having bitrate, quality or other parameters that differ from that of the original media content. For example, in particular embodiments, transcoder/encoder 104 encodes and/or transcodes the source media into one or more lower quality versions of the original media content in order for the media content to be more suitable for streaming. Transcoder/encoder 104 is further configured to pass the transcoded media content to encapsulator 106.

Encapsulator 106 is configured to generate one or more indexes that indicate the location of video and/or audio data and associated metadata within the media content. In one or more embodiments, the common format index files may be generated directly from the common format media or via a translation from another format of index file. In at least one embodiment, separate index files may be created for each of the video, audio, and timed metadata to separately store the associated indexing data. In still other embodiments, a single index file may be created to store indexing data for the video, audio, and metadata. In still other embodiments, video and audio data may be indexed together in a separate file and the timed metadata may be indexed in a separate file by itself. In accordance with various embodiments, encapsulator 106 creates additional state information in the timed metadata index to enable ODE module 110 to later retrieve the correct amount of timed metadata required for a current segment or chunk of media content currently being delivered to client device 116. In accordance with various embodiments, encapsulator 106 generates the common format asset that may be later converted into a specific target format appropriate for delivery to a particular ABR client device. Encapsulator 106 then sends the common format asset to origin server 108. In response, origin server 108 stores the common format asset containing one or more indexes including the timed metadata index within storage device 112. Although the embodiment illustrated in FIG. 1 shows a single storage device 112, it should be understood that in other embodiments one or more storage devices may be used.

At a later time, client device 116 requests the timed metadata from origin server 108 via CDN 114 and CDN 114 relays the request to origin server 108. In some embodiments, the request may also include a request for media such as audio or video in addition to a request for specific timed metadata within the media content. In still other embodiments, separate requests may be sent for the timed metadata, video data, and/or audio data. ODE module 110 then retrieves the timed metadata index from storage device 112 and determines the portions of the timed metadata needed to service the request. ODE module 110 then uses the timed metadata index to extract within the common format media only the portions of the timed metadata needed for the duration of time corresponding to the request. ODE module 110 then converts the timed metadata into a target format supported by client device 116, and encapsulates and sends the timed metadata in the target format to client device 116. In one or more embodiments, the timed metadata index file may contain the actual timed metadata, in which case ODE module 110 only needs to process the timed metadata and does not need to extract the timed metadata from the common format file.

As discussed, in one or more embodiments ODE module 110 is responsible for translating content from the common format into a client-specific target format. In a particular embodiment, the two main transformations that are performed include: 1) Transforming the Media Presentation Description (MPD) into a target format manifest (HLS Variant+Stream Playlists, Smooth Client Manifest); and 2) transforming the common format asset media into target format ABR segments. In a particular embodiment, a third transformation is defined which includes transforming from asset media into target format ABR timedmetadata segments. This transformation uses the common format asset indexing data to more efficiently locate the timed metadata in the common format asset.

In the creation of target format timed metadata segments, ODE module 110 creates a segment containing the correct timed metadata in an efficient manner. Creating the timed metadata track efficiently requires extracting the timed metadata from the source asset into a separate index file by encapsulator 106. This file may contain a single track of timed metadata along with information such that the presentation time of the timed metadata is preserved. Enabling ODE module 110 to use this separate file, instead of the high bandwidth source asset, preserves network bandwidth and increases the efficiency of the timed metadata track creation. Instead of processing a full common format asset stream, which can be on the order of megabits per second, ODE module 110 now only needs to process the timed metadata track, which may be only tens or hundreds of bits per second.

To ensure the correctness of the timed metadata delivered to client device 116, the timed metadata segment N created by ODE module 110 (produced non-linearly) should be equivalent to a timed metadata segment N produced linearly. ODE module 110 uses the timed metadata index file to construct the timed metadata segment. The timed metadata index file is augmented to include reference points generated by encapsulator 106 that impose a structure onto the timed metadata. In a particular embodiment, a reference point for metadata may be envisioned as being similar to an IDR frame for video. To present timed metadata after the reference point, no metadata prior to the reference point is necessary. Accordingly, the reference point contains information to provide all necessary state information to reconstruct the correct timed metadata state from that point in time forward. For example, for a reference point at a time T_r and all times T>T_r, creating the timed metadata track at all times T uses only the timed metadata at times >=T_r.

The construction of timed metadata reference points may be specific to the particular timed metadata format. For example, closed caption reference points can be created based on the location of pop-on captions within the video data. Additionally, caption reference points may be created by rendering a series of paint-on or roll-up caption sequences. In general, in various embodiments timed metadata reference points may be created by simulated rendering of the timed metadata by encapsulator 106 and persisting the current state of the timed metadata into the timed metadata index file at the desired time. A particular example case for this is timed metadata describing a game clock in a sporting event. Assume that the clock is provided in timed metadata in one second increments from the previously provided update. Joining this timed metadata track in the middle of the sporting event without the timed metadata indexing as described herein does not provide enough information to reconstruct the current time. A naive approach is to process all metadata since the beginning of the event. A more intelligent approach provided by various embodiments includes generating a metadata index that contains periodic timed metadata reference points that reflect the absolute time in the sporting event. By using the index of timed metadata, joining the timed metadata track at a particular time provides enough information to provide the current timed metadata information to client device 116 despite only receiving the timed metadata since the last reference point.

Accordingly, rather than parsing an entire asset to retrieve timed metadata, a separate timed metadata index file is used to reproduce the timed metadata. This timed metadata index file includes reference points in the timed metadata which bound the creation of state based timed metadata ABR segments.

Various embodiments may provide one or more of the following advantages: increasing efficiency, requiring the use of less storage space than that required for multiple on-disk stored representations of target format metadata tracks, the ability of on-demand translation to support changes in target formats without reprocessing the source asset, and the use of a separate index file for timed metadata avoids unnecessary transformations and fetching of adaptive transport stream (ATS) data.

Figure 2:
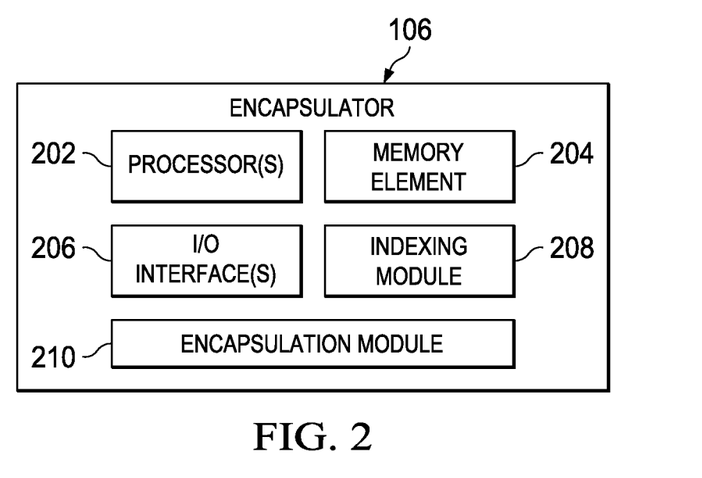
FIG. 2 illustrates a simplified block diagram of an embodiment of the encapsulator of FIG. 1.

FIG. 2 illustrates a simplified block diagram of an embodiment of encapsulator 106 of FIG. 1. Encapsulator 106 includes processor(s) 202, memory element 204, input/output (I/O) interface(s) 206, index module 208, an encapsulation module 210. Processor(s) 202 is configured to execute various tasks of encapsulator 106 as described herein and memory element 204 is configured to store data associated with encapsulator 106. I/O interface(s) 206 is configured to receive communications from and send communications to other devices or software modules such as transcoder/encoder 104 and origin server 108. Indexing module 208 is configured to receive source video and/or source audio including timed metadata and create an index of the source video and/or source audio and timed metadata as further described herein. Encapsulator module 210 is configured to convert the received source video and/or audio and timed metadata into a common media format encapsulation as further described herein.

In one implementation, encapsulator 106 is a network element that includes software to achieve (or to foster) the encapsulation and indexing operations as outlined herein in this Specification. Note that in one example, each of these elements can have an internal structure (e.g., a processor, a memory element, etc.) to facilitate some of the operations described herein. In other embodiments, these encapsulation and indexing operations may be executed externally to this element, or included in some other network element to achieve this intended functionality. Alternatively, encapsulator 106 may include software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 3:
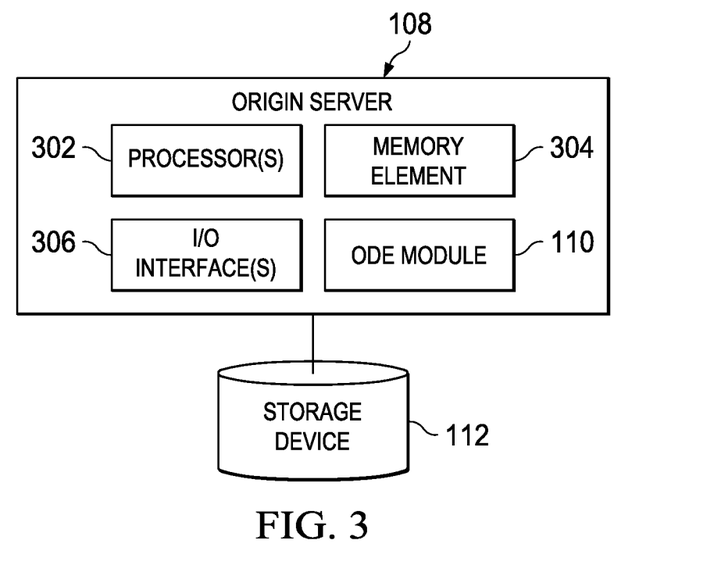
FIG. 3 illustrates a simplified block diagram of an embodiment of the origin server and the storage device of FIG. 1.

FIG. 3 illustrates a simplified block diagram of an embodiment of origin server 108 and storage device 112 of FIG. 1. Origin server 108 includes processor(s) 302, memory element 304, I/O interface(s) 306, and ODE module 110. As illustrated in FIG. 3, origin server 108 is further in communication with storage device 112. Processor(s) 302 is configured to execute various tasks of origin server 108 as described herein and memory element 304 is configured to store data associated with origin server 108. I/O interface(s) 306 is configured to receive communications from and send communications to other devices or software modules such as encapsulator 106 and client device 116. ODE module 110 is configured to perform the various on-demand encapsulation operations as further described herein.

In one implementation, origin server 108 is a network element that includes software to achieve (or to foster) the server and on-demand encapsulation operations as outlined herein in this Specification. Note that in one example, each of these elements can have an internal structure (e.g., a processor, a memory element, etc.) to facilitate some of the operations described herein. In other embodiments, these server and on-demand encapsulation operations may be executed externally to this element, or included in some other network element to achieve this intended functionality. Alternatively, origin server 108 may include software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 4:
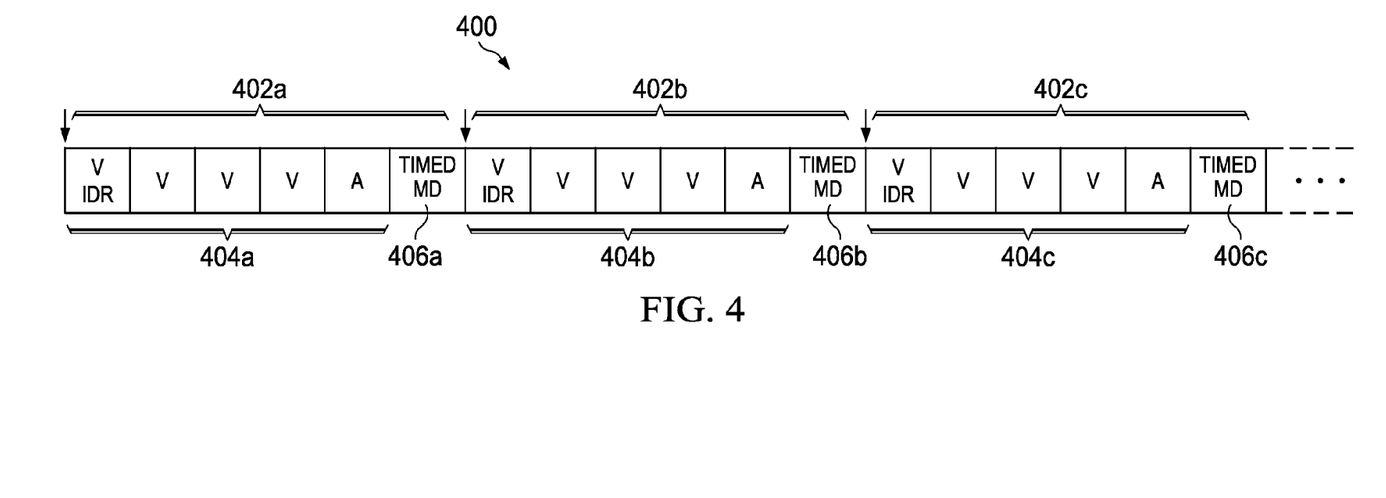
FIG. 4 is a simplified diagram of an example embodiment of common format media.

FIG. 4 is a simplified diagram of an example embodiment of common format media 400. Common format media 400 includes a number of segments each containing one or more of video data, audio data, and timed metadata. In at least one embodiment, common format media 400 is an ATS media stream. In the particular embodiment illustrated in FIG. 4, common format media 400 includes a first segment 402a, a second segment 402b, and a third segment 402c. First segment 402a contains four video frames 404a including video content in which the first video frame is an instantaneous decoder refresh (IDR) frame. First segment 402a further includes an audio frame 404a including audio content, and a timed metadata frame 406a including timed metadata content such as a closed captioning, ad-insertion or other timed metadata content.

Similarly, second segment 402b includes contains four video frames 404b including further video content in which the first video frame is an instantaneous decoder refresh (IDR) frame, an audio frame 404b including audio content, and a timed metadata frame 406b including timed metadata content such as a closed captioning, ad-insertion or other timed metadata content. Third segment 402c includes contains four video frames 404c including further video content in which the first video frame is an instantaneous decoder refresh (IDR) frame, an audio frame 404c including audio content, and a timed metadata frame 406c including timed metadata content such as a closed captioning, ad-insertion or other timed metadata content.

In at least one embodiment, encapsulator 106 provides common format media 400 to origin server 108, which stores common format media 400 within storage device 112.

Figure 5:
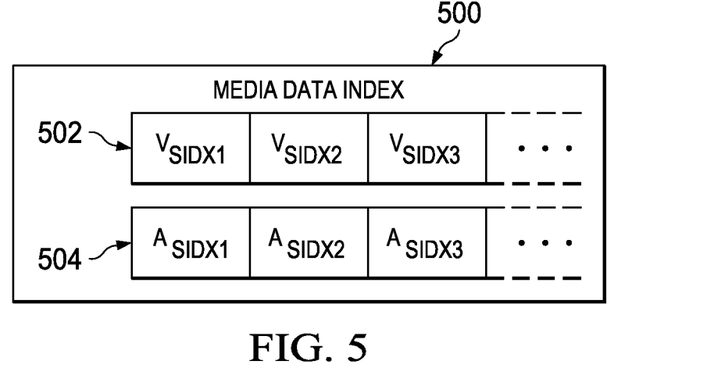
FIG. 5 is a simplified diagram of an embodiment of a media data index file as generated by the encapsulator.

FIG. 5 is a simplified diagram of an embodiment of a media data index file 500 as generated by encapsulator 106. In a particular embodiment, media data index 500 is generated by encapsulator 106 from the video and audio frames of common format media 400. Media data index file 500 includes a video data index 502 and an audio data index 504. Video data index 502 is illustrated as including a first video index segment $V_{SIDX1}$, a second video index segment $V_{SIDX2}$, and a third video index segment $V_{SIDX3}$. Each of first video index segment $V_{SIDX1}$, second video index segment $V_{SIDX2}$, and third video index segment $V_{SIDX3}$ corresponds to a portion of common format media 400 and includes information which may be used by ODE module 110 to locate a requested segment of video data within common format media 400, retrieve the requested segment of video data, and format the requested segment of video data into a format suitable for delivery to client device 116. Audio data index 504 is illustrated in FIG. 5 as including a first audio index segment $A_{SIDX1}$, a second audio index segment $A_{SIDX2}$, and a third audio index segment $A_{SIDX3}$. Each of first audio index segment $A_{SIDX1}$, second audio index segment $A_{SIDX2}$, and third audio index segment $A_{SIDX3}$ corresponds to a portion of common format media 400 and includes information which may be used by ODE module 110 to locate a requested segment of audio data within common format media 400, retrieve the requested segment of audio data, and format the requested segment of audio data into a format suitable for delivery to client device 116.

Figure 6:
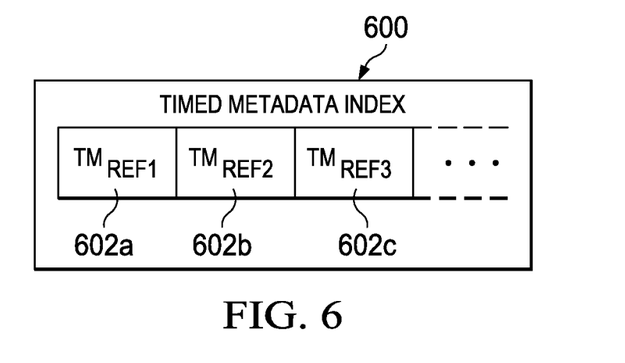
FIG. 6 is a simplified diagram of an embodiment of a timed metadata index file as generated by the encapsulator.

FIG. 6 is a simplified diagram of an embodiment of a timed metadata index file 600 as generated by encapsulator 106. In a particular embodiment, timed metadata index file is generated from the timed metadata frames of common format media 400 such as time metadata frames 406a-406c. Timed metadata index file 600 includes a first timed metadata reference point $TM_{REF1}$, a second timed metadata reference point $TM_{REF1}$, and a third timed metadata reference point $TM_{REF1}$. Each of first timed metadata reference point $TM_{REF1}$, second timed metadata reference point $TM_{REF1}$, and third timed metadata reference point $TM_{REF1}$ includes all state information necessary state for ODE module 110 to reconstruct the correct timed metadata state from that point forward within the timed metadata in response to a request for the timed metadata received from client device 116. By using the timed metadata index file 600, joining the timed metadata track by client device 116 provides enough information to provide the current timed metadata information to client device 116 despite only receiving the timed metadata information since the last reference point.

Figure 7:
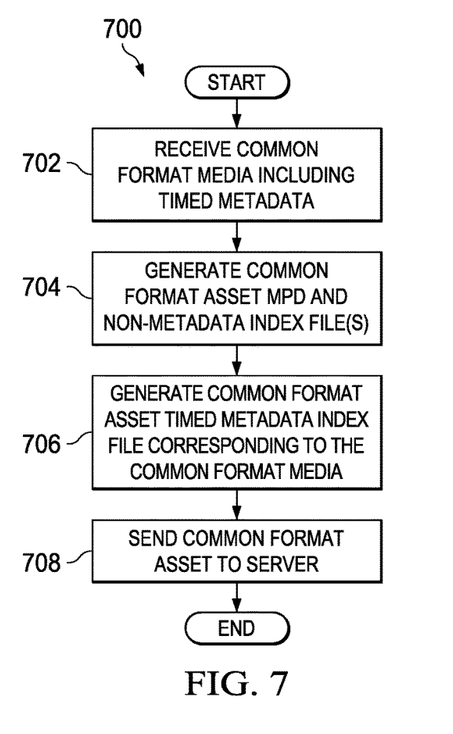
FIG. 7 is a simplified flowchart illustrating one potential operation of the encapsulator of FIG. 1.

FIG. 7 is a simplified flowchart 700 illustrating one potential operation of encapsulator 106 of FIG. 1. In 702, encapsulator 106 receives common format media that includes timed metadata. In at least one embodiment, the media includes data such as one or more of video data or audio data associated with a media presentation or program. In a particular embodiment, encapsulator 106 receives the common format media from transcoder/encoder 104, and transcoder/encoder 104 receives the media content from media content source 102. In 704, encapsulator 106 generates portions of the common format asset including the Media Presentation Description and media data index files corresponding to non-metadata within the common format media. In 706, encapsulator 106 further generates the timed metadata index file corresponding to the common format media. The timed metadata index file includes one or more timed metadata reference points corresponding to the common format media. In a particular embodiment, each reference point includes state context information of the timed metadata at a particular instance of time. The timed metadata file is included in the common format asset.

In 708, encapsulator 106 sends the common format asset to a server. In a particular embodiment, encapsulator 106 sends the common format asset to origin server 108 and origin server 108 stores the common format asset in one or more storage devices such as storage device 112. The flow then ends. As further discussed herein, in one or more embodiments ODE module 110 of origin server 108 may receive a request for timed metadata within the common format asset and ODE module 110 may use the timed metadata index to determine how far back within the common format asset that is should go to retrieve a sufficient determined amount of the timed metadata necessary to produce the current timed metadata context at the current presentation time. For example, in a case in which the timed metadata is closed captioning data, the ODE module 110 may use the timed metadata index file to retrieve an amount of the caption data from the common format asset that is necessary to completely produce the current on-screen text for that instance in time and sends the caption data to client device 116.

Figure 8:
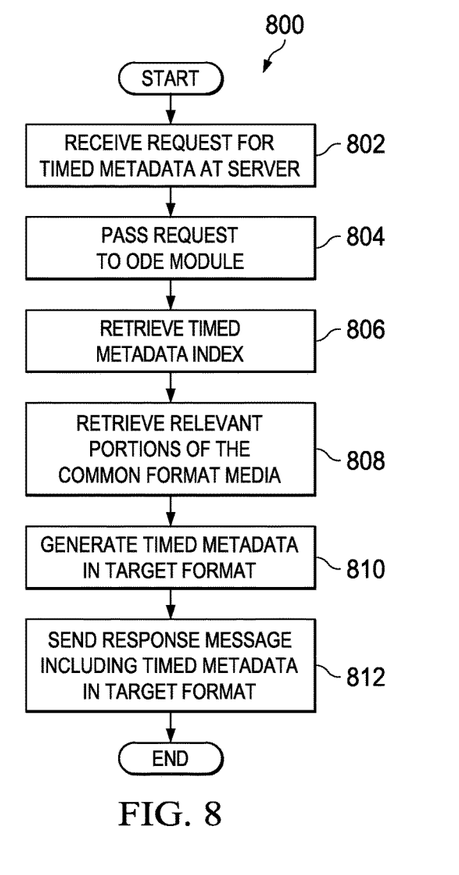
FIG. 8 is a simplified flowchart illustrating one potential operation of the origin server.

FIG. 8 is a simplified flowchart illustrating one potential operation of origin server 108. In 802, origin server 108 receives a request for timed metadata from client device 116. In a particular embodiment, the requested timed metadata may include closed captioning, subtitles, ad-insertions or any other timed metadata associated with media content. In 804, origin server 108 passes the request to ODE module 110. In 806, ODE module 110 retrieves the timed metadata index corresponding to the timed metadata within the common format asset from storage device 112. In 808, ODE module 110 further retrieves the relevant portions of the common format media including the requested timed metadata from storage device 112. In particular embodiments, the common format media may further include media data such as video or audio data associated with the timed metadata.

In 810, ODE module 110 generates timed metadata in a target format from the common format asset using the timed metadata index. In at least one embodiment, ODE module 100 uses the timed metadata index to retrieve a determined amount of the timed metadata from the common format asset sufficient to produce the current timed metadata context at the current presentation time. In at least one embodiment, the target format for the timed metadata is a format suitable for client device 116. In a particular embodiment, the target format may be, for example, an HLS format, an HSS format, an HDS format or a DASH format in accordance with the capabilities of client device 116.

In 812, origin server 108 sends a response message including the timed metadata in the target format to client device 116. The flow then ends. In one or more embodiments, client device 116 may then present the timed metadata in association with media content such as video or audio content.

Figure 9:
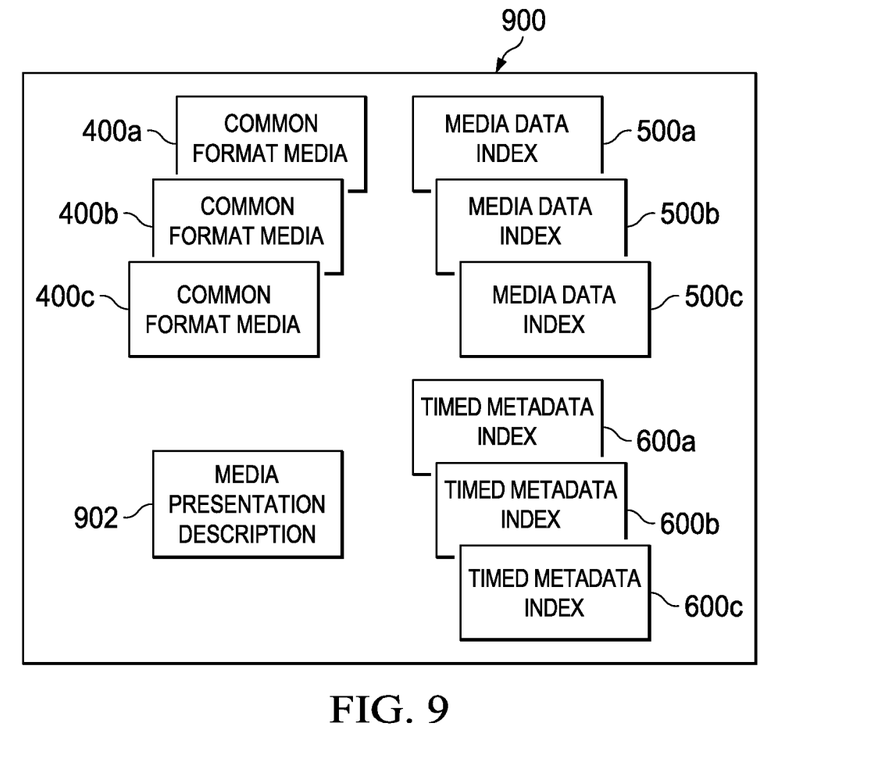
FIG. 9 is a simplified diagram of an embodiment of a common format asset as generated by the encapsulator of FIG. 1.

FIG. 9 is a simplified diagram of an embodiment of a common format asset 900 as generated by the encapsulator of FIG. 1. In the particular embodiment of FIG. 9, common format asset 900 includes three common format media 400a-400c, three media data indexes 500a-500c, three timed metadata indexes 600a-600c, and a Media Presentation Description (MPD) 902. One or more of common format media 400a-400c may be formatted in the same or similar manner as common format media 400 as described with respect to FIG. 4. One or more of media data indexes 500a-500c may be formatted in the same or similar manner as media data index 500 as described with respect to FIG. 5. One or more of timed metadata indexes 600a-600c may be formatted in the same or similar manner as timed metadata index 600 as described with respect to FIG. 6. MPD 902 is a manifest or file containing information about the common format media 400a-400c, such as one or more formats of segments of audio or video data that is used during presentation of the media content. Although the particular embodiment is illustrated as using three common format media 400a-400c, three media data indexes 500a-500c, three timed metadata indexes 600a-600c, and a single MPD 902, it should be understood that in other embodiments common format asset 900 may include any number of common format media, media data indexes, timed metadata indexes, and MPDs.

Communication network 100 represents a series of points or nodes of interconnected communication paths for receiving and transmitting packets of information that propagate through communication system 100. Communication network 100 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. Communication network 100 may implement a UDP/IP connection and use a TCP/IP communication language protocol in particular embodiments of the present disclosure. However, communication network 100 may alternatively implement any other suitable communication protocol for transmitting and receiving data packets within communication system 100.

Transcoder/encoder 104, encapsulator 106, and origin server 108 are network elements that facilitate on-demand encapsulating of timed metadata in a given network (e.g., for networks such as that illustrated in FIG. 1). As used herein in this Specification, the term 'network element' is meant to encompass routers, switches, gateways, bridges, loadbalancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

In one implementation, encapsulator 106 and origin server 108 include software to achieve (or to foster) the on-demand encapsulating of timed metadata operations, as outlined herein in this Specification. Note that in one example, each of these elements can have an internal structure (e.g., a processor, a memory element, etc.) to facilitate some of the operations described herein. In other embodiments, these on-demand encapsulating operations may be executed externally to these elements, or included in some other network element to achieve this intended functionality. Alternatively, encapsulator 106 and origin server 108 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Note that in certain example implementations, the on-demand encapsulation functions outlined herein may be implemented by logic encoded in one or more non-transitory, tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 2 and FIG. 3) can store data used for the operations described herein.

This includes the memory element being able to store software, logic, code, or processor instructions that are executed to carry out the activities described in this Specification. A processor can execute any type of instructions associated with the data to achieve the operations detailed herein in this Specification. In one example, the processor (as shown in FIG. 2 and/or FIG. 3) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, encapsulator 106 and/or origin server 108 may include software in order to achieve the forwarding determination functions outlined herein. These activities can be facilitated by indexing module 208, encapsulation module 210, and/or ODE module 110 (where these modules can be suitably combined in any appropriate manner, which may be based on particular configuration and/or provisioning needs). Encapsulator 106 and origin server 108 can include memory elements for storing information to be used in achieving the on-demand encapsulation activities, as discussed herein. Additionally, encapsulator 106 and/or origin server 108 may include a processor that can execute software or an algorithm to perform the on-demand encapsulation operations, as disclosed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

It should also be noted that many of the previous discussions may imply a single client-server relationship. In reality, there is a multitude of servers and clients in certain implementations of the present disclosure. Moreover, the present disclosure can readily be extended to apply to intervening servers further upstream in the architecture. Any such permutations, scaling, and configurations are clearly within the broad scope of the present disclosure.

Although the present disclosure has been described in detail with reference to particular arrangements and configurations, these example configurations and arrangements may be changed significantly without departing from the scope of the present disclosure. Additionally, although communication system 100 has been illustrated with reference to particular elements and operations that facilitate the communication process, these elements and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving common format media including timed metadata, wherein the timed metadata does not include reference points in which a state of the timed metadata is reset;
generating at least one reference point corresponding to the common format media, each reference point including state context information of the timed metadata sufficient to reconstruct a current context of the timed metadata and a presentation time of the current context of the timed metadata independently of any state context information included with any prior reference point of the timed metadata index;
generating a timed metadata index including the at least one reference point; and
generating a common format asset including the timed metadata and the timed metadata index;
wherein generating the at least one reference point includes:

rendering the timed metadata to produce a current state of the timed metadata at the presentation time; and
persisting the current state of the timed metadata at the presentation time into the timed metadata index.

2. The method of claim 1, further comprising sending the common format asset to at least one server.

3. The method of claim 1, further comprising:
receiving a request for the timed metadata from a particular client device; and
retrieving a determined amount of the timed metadata from the common format asset using the timed metadata index.

4. The method of claim 3, wherein the determined amount of the timed metadata is an amount sufficient to display a current timed metadata context corresponding to the request.

5. The method of claim 3, further comprising:
converting the retrieved timed metadata to a target format suitable for the particular client device; and
sending a response message including the retrieved timed metadata in the target format to the particular client device.

6. The method of claim 1, wherein the common format media is an MPEG2-TS adaptive transport stream file.

7. The method of claim 1, wherein the common format media an ISO Base Media File Format (ISO-BMFF) file.

8. The method of claim 1, wherein the timed metadata includes at least one of caption data, subtitle data, ad-insertion marker data and application-specific metadata.

9. One or more non-transitory tangible media that includes code for execution and when executed by a processor operable to perform operations comprising:
receiving common format media including timed metadata, wherein the timed metadata does not include reference points in which a state of the timed metadata is reset;
generating at least one reference point corresponding to the common format media, each reference point including state context information of the timed metadata sufficient to reconstruct a current context of the timed metadata and a presentation time of the current context of the timed metadata independently of any state context information included with any prior reference point of the timed metadata index;
generating a timed metadata index including the at least one reference point; and
generating a common format asset including the timed metadata and the timed metadata index;
wherein generating the at least one reference point includes:
rendering the timed metadata to produce a current state of the timed metadata at the presentation time; and
persisting the current state of the timed metadata at the presentation time into the timed metadata index.

10. The media of claim 9, wherein the operations further include sending the common format asset to at least one server.

11. The media of claim 9, wherein the operations further include:
receiving a request for the timed metadata from a particular client device; and
retrieving a determined amount of the timed metadata from the common format asset using the timed metadata index.

12. The media of claim 11, wherein the determined amount of the timed metadata is an amount sufficient to display a current timed metadata context corresponding to the request.

13. The media of claim 11, wherein the operations further include:
converting the retrieved timed metadata to a target format suitable for the particular client device; and
sending a response message including the retrieved timed metadata in the target format to the particular client device.

14. The media of claim 9, wherein the common format media is an MPEG2-TS adaptive transport stream file.

15. The media of claim 9, wherein the common format media an ISO Base Media File Format (ISO-BMFF) file.

16. The media of claim 9, wherein the timed metadata includes at least one of caption data, subtitle data, ad-insertion marker data and application-specific metadata.

17. An apparatus, comprising:
a memory element configured to store data,
a processor operable to execute instructions associated with the data, and
at least one module being configured to:
receive common format media including timed metadata, wherein the timed metadata does not include reference points in which a state of the timed metadata is reset;
generate at least one reference point corresponding to the common format media, each reference point including state context information of the timed metadata sufficient to reconstruct a current context of the timed metadata and a presentation time of the current context of the timed metadata independently of any state context information included with any prior reference point of the timed metadata index;
generate a timed metadata index including the at least one reference point; and
generate a common format asset including the timed metadata and the timed metadata index;
wherein generating the at least one reference point includes:
rendering the timed metadata to produce a current state of the timed metadata at the presentation time; and
persisting the current state of the timed metadata at the presentation time into the timed metadata index.

18. The apparatus of claim 17, wherein the at least one module is further configured to send the common format asset to at least one server.

19. The apparatus of claim 17, wherein the at least one module is further configured to:
receive a request for the timed metadata from a particular client device; and
retrieve a determined amount of the timed metadata from the common format asset using the timed metadata index.

20. The apparatus of claim 19, wherein the determined amount of the timed metadata is an amount sufficient to display a current timed metadata context corresponding to the request.

* * * * *